United States Patent
Zhang et al.

(10) Patent No.: US 10,275,397 B2
(45) Date of Patent: Apr. 30, 2019

(54) DEDUPLICATION STORAGE SYSTEM WITH EFFICIENT REFERENCE UPDATING AND SPACE RECLAMATION

(71) Applicant: Veritas Technologies LLC, Mountain View, CA (US)

(72) Inventors: Xianbo Zhang, Plymouth, MN (US); Haibin She, Beijing (CN)

(73) Assignee: Veritas Technologies LLC, Santa Clara, CA (US)

( * ) Notice: Subject to any disclaimer, the term of this patent is extended or adjusted under 35 U.S.C. 154(b) by 258 days.

(21) Appl. No.: 13/774,083

(22) Filed: Feb. 22, 2013

(65) Prior Publication Data

US 2014/0244599 A1 Aug. 28, 2014

(51) Int. Cl.
*G06F 17/30* (2006.01)
*G06F 16/215* (2019.01)
*G06F 3/06* (2006.01)

(52) U.S. Cl.
CPC ............ *G06F 16/215* (2019.01); *G06F 3/067* (2013.01); *G06F 3/0608* (2013.01); *G06F 3/0641* (2013.01); *G06F 3/0652* (2013.01); *G06F 3/0673* (2013.01); *G06F 3/0683* (2013.01)

(58) Field of Classification Search
CPC ............... G06F 17/30067; G06F 17/30489
USPC ........................................................ 707/692
See application file for complete search history.

(56) References Cited

U.S. PATENT DOCUMENTS

| | | |
|---|---|---|
| 5,274,804 A | 12/1993 | Jackson et al. |
| 5,537,652 A | 7/1996 | Friedl et al. |
| 5,555,391 A | 9/1996 | De Subijana et al. |
| 5,561,421 A | 10/1996 | Smith |
| 5,990,810 A | 11/1999 | Williams |
| 6,014,676 A | 1/2000 | McClain |
| 6,141,784 A | 10/2000 | Davis |
| 6,292,795 B1 | 9/2001 | Peters et al. |
| 6,389,433 B1 | 5/2002 | Bolosky et al. |
| 6,513,051 B1 | 1/2003 | Bolosky et al. |
| 6,785,786 B1 | 8/2004 | Gold et al. |
| 6,865,655 B1 | 3/2005 | Andersen |
| 6,920,537 B2 | 7/2005 | Ofek et al. |
| 6,983,365 B1 | 1/2006 | Douceur et al. |
| 7,055,008 B2 | 5/2006 | Niles |

(Continued)

OTHER PUBLICATIONS

International Search Report and Written Opinion in International Application No. PCT/US2014/017655, dated May 21, 2014, 9 pages.

(Continued)

*Primary Examiner* — Hicham Skhoun

(74) *Attorney, Agent, or Firm* — Meyertons Hood Kivlin Kowert and Goetzel PC; Rory D. Rankin

(57) ABSTRACT

A deduplication storage system and associated methods are described. The deduplication storage system may split data objects into segments and store the segments. A plurality of data segment containers may be maintained. Each of the containers may include two or more of the data segments. Maintaining the containers may include maintaining a respective logical size of each container. In response to detecting that the logical size of a particular container has fallen below a threshold level, the deduplication storage system may perform an operation to reclaim the storage space allocated to one or more of the data segments included in the particular container.

20 Claims, 14 Drawing Sheets

(56) References Cited

U.S. PATENT DOCUMENTS

| | | |
|---|---|---|
| 7,136,976 B2 | 11/2006 | Saika |
| 7,146,429 B2 | 12/2006 | Michel |
| 7,200,604 B2 | 4/2007 | Forman et al. |
| 7,213,158 B2 | 5/2007 | Bantz et al. |
| 7,257,104 B2 | 8/2007 | Shitama |
| 7,257,643 B2 | 8/2007 | Mathew |
| 7,310,644 B2 | 12/2007 | Adya et al. |
| 7,318,072 B2 | 1/2008 | Margolus |
| 7,359,920 B1 | 4/2008 | Rybicki et al. |
| 7,373,520 B1 | 5/2008 | Borthakur et al. |
| 7,376,683 B1 | 5/2008 | Wolczko et al. |
| 7,389,394 B1 | 6/2008 | Karr |
| 7,401,194 B2 | 7/2008 | Jewell |
| 7,409,523 B2 | 8/2008 | Pudipeddi |
| 7,424,514 B2 | 9/2008 | Noble et al. |
| 7,454,592 B1 | 11/2008 | Shah |
| 7,478,113 B1 | 1/2009 | De Spiegeleer et al. |
| 7,509,360 B2 | 3/2009 | Wollrath et al. |
| 7,567,188 B1 | 7/2009 | Anglin et al. |
| 7,610,285 B1 | 10/2009 | Zoellner et al. |
| 7,636,767 B2 | 12/2009 | Lev-ran et al. |
| 7,672,981 B1 | 3/2010 | Faibish et al. |
| 7,685,459 B1 | 3/2010 | De Spiegeleer et al. |
| 7,689,764 B1 | 3/2010 | De Spiegeleer et al. |
| 7,693,919 B2 | 4/2010 | Joisha |
| 7,725,444 B2 | 5/2010 | Devarakonda et al. |
| 7,801,894 B1 | 9/2010 | Bone et al. |
| 7,805,449 B1 | 9/2010 | Bone et al. |
| 8,074,043 B1 | 12/2011 | Zeis |
| 8,095,572 B1 | 1/2012 | Coghlan |
| 8,201,021 B1 | 6/2012 | Shah et al. |
| 8,204,862 B1 | 6/2012 | Paulzagade et al. |
| 8,224,874 B2* | 7/2012 | Guo et al. ............ 707/813 |
| 8,255,366 B1 | 8/2012 | Bagley et al. |
| 8,285,681 B2* | 10/2012 | Prahlad et al. ............ 707/640 |
| 8,315,985 B1 | 11/2012 | Ohr et al. |
| 8,392,376 B2* | 3/2013 | Guo ............ 707/664 |
| 8,578,120 B2* | 11/2013 | Attarde et al. ............ 711/170 |
| 8,589,640 B2* | 11/2013 | Colgrove et al. ............ 711/156 |
| 8,635,184 B2* | 1/2014 | Hsu et al. ............ 707/609 |
| 8,914,324 B1 | 12/2014 | Guo et al. |
| 9,026,499 B1* | 5/2015 | Rajimwale et al. ............ 707/674 |
| 2001/0045962 A1 | 11/2001 | Lee |
| 2002/0107877 A1 | 8/2002 | Whiting et al. |
| 2002/0143797 A1 | 10/2002 | Zhang et al. |
| 2004/0044707 A1 | 3/2004 | Richard |
| 2004/0044873 A1* | 3/2004 | Wong et al. ............ 711/218 |
| 2004/0143731 A1 | 7/2004 | Audebert et al. |
| 2005/0027766 A1 | 2/2005 | Ben |
| 2005/0065986 A1 | 3/2005 | Bixby et al. |
| 2005/0198328 A1 | 9/2005 | Lee et al. |
| 2005/0204108 A1 | 9/2005 | Ofek |
| 2005/0216813 A1 | 9/2005 | Cutts et al. |
| 2006/0004868 A1 | 1/2006 | Claudatos et al. |
| 2006/0026219 A1 | 2/2006 | Orenstein et al. |
| 2006/0271540 A1 | 11/2006 | Williams |
| 2007/0061359 A1 | 3/2007 | Kilday |
| 2007/0192548 A1 | 8/2007 | Williams |
| 2007/0198659 A1 | 8/2007 | Lam |
| 2007/0250674 A1 | 10/2007 | Fineberg et al. |
| 2008/0005141 A1 | 1/2008 | Zheng et al. |
| 2008/0046404 A1 | 2/2008 | Bone et al. |
| 2008/0104146 A1 | 5/2008 | Schwaab et al. |
| 2008/0133561 A1 | 6/2008 | Dubnicki et al. |
| 2008/0154989 A1 | 6/2008 | Arman |
| 2008/0228939 A1 | 9/2008 | Samuels et al. |
| 2008/0243769 A1 | 10/2008 | Arbour et al. |
| 2008/0243878 A1 | 10/2008 | De Spiegeleer et al. |
| 2008/0243953 A1 | 10/2008 | Wu et al. |
| 2008/0244204 A1 | 10/2008 | Cremelie et al. |
| 2009/0013129 A1 | 1/2009 | Bondurant |
| 2009/0094186 A1 | 4/2009 | Kan |
| 2009/0132616 A1 | 5/2009 | Winter et al. |
| 2009/0157580 A1 | 6/2009 | Abnous et al. |
| 2009/0182789 A1 | 7/2009 | Sandorfi et al. |
| 2009/0259701 A1 | 10/2009 | Wideman et al. |
| 2010/0049735 A1* | 2/2010 | Hsu ............ 707/103 R |
| 2010/0083003 A1 | 4/2010 | Spackman |
| 2010/0125553 A1 | 5/2010 | Huang et al. |
| 2010/0174684 A1 | 7/2010 | Schwaab et al. |
| 2010/0223441 A1* | 9/2010 | Lillibridge ............ G06F 3/0608 711/165 |
| 2010/0250896 A1 | 9/2010 | Matze |
| 2010/0257403 A1 | 10/2010 | Virk et al. |
| 2010/0274982 A1 | 10/2010 | Mehr et al. |
| 2010/0332452 A1* | 12/2010 | Hsu ............ G06F 17/30156 707/640 |
| 2010/0332456 A1 | 12/2010 | Prahlad et al. |
| 2011/0167096 A1 | 7/2011 | Guo et al. |
| 2012/0059800 A1* | 3/2012 | Guo ............ G06F 17/30138 707/664 |
| 2012/0159098 A1* | 6/2012 | Cheung et al. ............ 711/162 |
| 2012/0290540 A1* | 11/2012 | Walkauskas ............ 707/674 |
| 2013/0268500 A1* | 10/2013 | Huang ............ 707/692 |
| 2014/0089275 A1* | 3/2014 | Akirav ............ G06F 17/30156 707/692 |

OTHER PUBLICATIONS

International Search Report and Written Opinion Application No. PCT/US2011/050101 dated Feb. 14, 2012.

Bromley et al., "Single Instance Storage", U.S. Appl. No. 11/641,389, filed Dec. 18, 2006.

Vrable, Michael et al., "Cumulus: Filesystem Backup to the Cloud", ACM Transactions on Storage, Dec. 2009, vol. 5, Issue 4, 28 pages, ACM, New York, NY, USA.

Yang, Tianming et al., "DEBAR: A Scalable High-Performance De-duplication Storage System for Backup and Archiving", IEEE, Apr. 19-23, 2010, 12 pages.

IBM technote "Details on mail template Discover Folders action and @Command DiscoverFolders," http://www-01.ibm.com/support/docview.wss?rs=475&uid=swg21201309, Jan. 6, 2009, 3 pages.

IBM technote, "LotusScript FolderReferences property helps determine in which folders a document is stored," http://www-01.ibm.com/support/docview.wss?rs=463&uid=swg21092899, Jan. 22, 2009, 4 pages.

Lotus discussion forum, "Notes/Domino 6 and 7 Forum," http://www-10.lotus.com/ldd/nd6forum.nsf/c21908baf7e06eb085256a39006eae9f/8b9065734138ec3485256eba005b107f?OpenDocument, Jun. 21, 2004, 3 pages.

IBM technote, comp.groupware.lotus-notes.apps, "How to determine folder where a message is," http://groups.google.com/group/comp.groupware.lotus-notes.apps/browse_thread/thread/355ed38a08943664/c7655d08d258d903%20http://www-01.ibm.com/support/docview.wss?rs=463&uid=swg21092899, Jul. 23, 2008, 2 pages.

Wilson, Paul R., "Uniprocessor Garbage Collection Techniques", IWMM '92 Proceedings of the International Workshop on Memory Management, Sep. 17, 1992, 34 pages, Springer-Verlag, London, UK.

Examination Report No. 1 for Australian Application No. 2014218837, dated Dec. 12, 2018, 3 pages.

* cited by examiner

FIG. 13

Segment Index 334

| Segment 305A Used? - N | Segment 305B Used? - N | Segment 305C Used? - N | Segment 305D Used? - N | Segment 305E Used? - N | Segment 305F Used? - N |
|---|---|---|---|---|---|
| Segment 305G Used? - N | Segment 305H Used? - N | Segment 305I Used? - N | Segment 305J Used? - N | Segment 305K Used? - N | Segment 305L Used? - N |
| Segment 305M Used? - N | Segment 305N Used? - N | Segment 305O Used? - N | Segment 305P Used? - N | Segment 305Q Used? - N | |

FIG. 14

Segment Index 334

| Segment 305A Used? - N | Segment 305B Used? - N | Segment 305C Used? - Y | Segment 305D Used? - N | Segment 305E Used? - Y | Segment 305F Used? - N |
|---|---|---|---|---|---|
| Segment 305G Used? - N | Segment 305H Used? - Y | Segment 305I Used? - Y | Segment 305J Used? - Y | Segment 305K Used? - Y | Segment 305L Used? - N |
| Segment 305M Used? - Y | Segment 305N Used? - Y | Segment 305O Used? - N | Segment 305P Used? - N | Segment 305Q Used? - N | |

DEDUPLICATION STORAGE SYSTEM WITH EFFICIENT REFERENCE UPDATING AND SPACE RECLAMATION

BACKGROUND OF THE INVENTION

Field of the Invention

This invention relates to the field of computer storage systems, and more particularly, to a deduplication storage system with efficient reference updating and space reclamation.

Description of the Related Art

The amount of data used by computer systems is increasing at a faster and faster rate. As a result, it is necessary to find ways to reduce the amount of storage space required to store the data. One way to do this is through deduplication. Many files, or portions of files, are duplicate copies of each other. Instead of storing multiple copies of the same data segment, a deduplication storage system can store a single copy of a data segment and maintain metadata specifying which files use the data segment. Thus, a single instance of a given data segment can be referenced by multiple files.

Eventually, some of the data segments may no longer be needed, e.g., because all the files that use those data segments may be deleted from the storage system. When this happens, it is desirable to reclaim the storage space taken by those data segments, e.g., so that the space can be re-allocated for new data segments added to the system. Thus, it may be necessary for the deduplication storage system to maintain reference information to keep track of which data segments are used by which files. For large data systems that store many data segments, it can be difficult to both efficiently maintain the reference information and efficiently reclaim the storage space when segments are no longer needed.

SUMMARY

Various embodiments of a deduplication storage system and associated methods which may be implemented by the system are described herein. According to some embodiments, the deduplication storage system may be configured to store a plurality of data objects on one or more storage devices of the deduplication storage system. Storing the data objects may include receiving a plurality of data segments of the data objects and storing the data segments. The deduplication storage system may be further configured to maintain a plurality of data segment containers. Each of the containers may include two or more of the data segments. Maintaining the containers may include maintaining a respective logical size of each container. In response to detecting that the logical size of a particular container has been reduced, the deduplication storage system may be configured to perform an operation to reclaim the storage space allocated to one or more of the data segments included in the particular container.

In some embodiments, detecting that the logical size of the particular container has been reduced may include one or more of: detecting that the logical size of the particular container has fallen below a threshold size; or detecting that the logical size of the particular container has been reduced by a threshold amount relative to a previous logical size of the particular container.

According to some embodiments, in adding a new data object to the deduplication storage system, the deduplication storage system may be configured to perform the following for each respective container of at least a subset of the plurality of containers: Determine that the respective container already includes one or more data segments of the new data object, and in response, increase the logical size of the respective container. For example, in some embodiments the deduplication storage system may be configured to: for each respective data segment of the one or more data segments of the new object that are already included in the respective container, add the size of the respective data segment to the logical size of the respective container.

According to further embodiments, in adding a new data object to the deduplication storage system, the deduplication storage system may be configured to perform the following for each respective container of at least a subset of the plurality of containers: Determine that the respective container already includes one or more data segments of the new data object, and update reference information for the respective container to indicate that the respective container is referenced by the new data object. The deduplication storage system may be configured to add the new data object to the deduplication storage system without updating reference information for individual data segments of the new data object.

The deduplication storage system may also be configured to remove data objects from the deduplication storage system. According to some embodiments, in removing a particular data object, the deduplication storage system may be configured to perform the following for each respective container of at least a subset of the plurality of containers: Determine that the respective container includes one or more data segments of the particular data object, and in response, decrease the logical size of the respective container. In some embodiments, in decreasing the logical size of each respective container, the deduplication storage system may be configured to calculate a sum of the sizes of the one or more data segments of the particular data object that are included in the respective container, and subtract the sum from the logical size of the respective container.

According to further embodiments, in removing a particular data object, the deduplication storage system may be configured to perform the following for each respective container of at least a subset of the plurality of containers: Determine that the respective container includes one or more data segments of the data object, and update reference information for the respective container to indicate that the respective container is no longer referenced by the data object. According to further embodiments, the deduplication storage system may be configured to: in response to determining that a given container is no longer referenced by any data object, reclaim the given container. Reclaiming the given container may include reclaiming storage space for each data segment included in the given container. The deduplication storage system may be configured to remove the data object from the deduplication storage system without updating reference information for individual data segments of the data object.

BRIEF DESCRIPTION OF THE DRAWINGS

FIGS. 7-17 illustrate an example of how a storage pool may be affected as data objects are added to and removed from the deduplication storage system.

Figure 1:
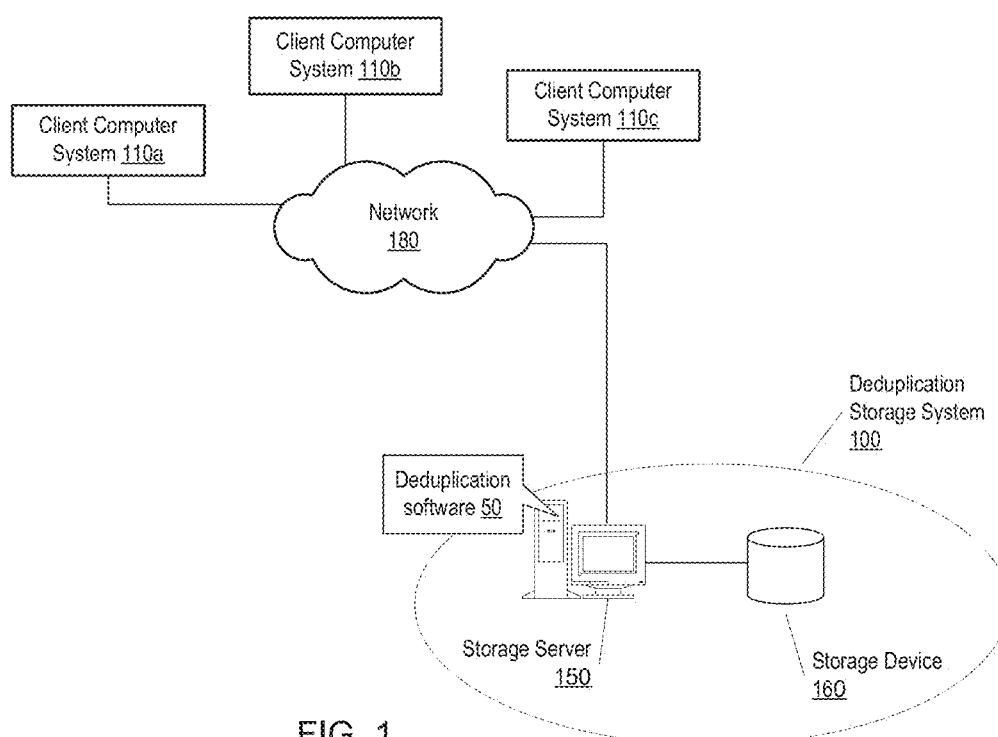
FIG. 1 illustrates one embodiment of a deduplication storage system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Various embodiments of a deduplication storage system are described herein. The deduplication storage system may be configured to store a plurality of data objects by splitting them into data segments and using deduplication techniques to store the data segments. The deduplication storage system may reduce or eliminate redundant data segments, e.g., so that at least one of the data segments stored in the system is used by multiple data objects. In some embodiments the deduplication storage system may operate so that only one copy of any given data segment is stored, e.g., so that all the data objects which include that segment use the same copy of the segment.

When a new data object is added, the deduplication storage system may split the data object into a plurality of data segments and check whether an identical copy of each segment is already stored in a pool of data segments. If a given segment is already stored, then the deduplication storage system segment may not add another copy of the segment to the segment pool. Otherwise, the deduplication storage system may allocate space from the segment pool for the segment and copy the segment into the allocated space. The deduplication storage system may also store metadata for the new data object which indicates which data segments are included in the data object and where they can be found.

The deduplication storage system may also update reference information in response to adding the new data object. Some conventional deduplication storage systems maintain reference information at the segment level, e.g., so that separate reference information is kept for each individual segment which specifies which data objects reference that segment. For example, if a new data object having 10,000 different data segments is added then a conventional system may add the new data object to 10,000 separate reference lists corresponding to each of the segments, thus resulting in 10,000 different reference update operations. Similarly, when a data object is removed or deleted, the conventional system may perform a separate operation to remove the data object from the corresponding reference list for each of the object's segments. For large systems in which millions or billions of data segments are stored and/or in which new data objects are continuously being added, the performance of the system may be significantly slowed down because of all the overhead of updating the reference information at such a granular level.

To overcome this problem, the deduplication storage system described in the present application may not track reference information at the segment level, but may instead take a different approach. The deduplication storage system may maintain a plurality of data segment containers. Each of the containers may include a subset of the data segments stored in the system, and reference information may be maintained at the container level. As a simple example, suppose that a new data object having 1000 new data segments which are not yet stored in the system is added. In some embodiments the new data segments may all be added to the same container, and the reference information for the container may be updated to indicate that the container is referenced by the new data object, but without updating or maintaining reference information for each individual one of the new data object's segments. Thus, instead of performing 1000 separate reference update operations at the segment level, only a single reference update operation at the container level may be performed, which may advantageously increase the efficiency of adding the new object.

As another example, suppose again that a new data object having 1000 new data segments is added. Instead of adding all 1000 data segments to the same container, it may be necessary to add them to multiple containers. For example, in some embodiments the containers may be limited to less than 1000 data segments, or may be limited to a size less than the total size of the new data object. Thus, instead of performing a single reference update operation for a single container, the deduplication storage system may perform a respective update operation for each container to which the new object's data segments were added. However, this may still result in significantly fewer than 1000 reference update operations. For example, if the container size is set to be 100 segments then the new object's segments may be stored across 10 new containers, thus resulting in only 10 reference update operations being performed (one for each container).

As another example, suppose that a new data object having 1000 data segments which are already stored in the system is added. In this case, the system may lookup the segments and discover which container each one is included in. For each container which includes one or more of the segments of the new data object, the reference information for the container may be updated to indicate that the container is referenced by the new object. Although it is theoretically possible that none of the segments are included in the same container, in actual practice for the average case it would be expected that at least some of the segments of the data object are grouped together with each other in a single container due to segment spatial locality, thereby resulting in increased efficiency by updating reference information at the container level instead of the more granular segment level.

Similar efficiencies may be achieved when removing data objects from the system. For example, if an object having 500 segments stored across 7 different containers is removed, the system may perform 7 respective update operations for each of these containers to indicate that they are no longer referenced by the data object, e.g., as opposed to performing 500 reference update operations to update reference information at the segment level.

Besides the efficiency of the deduplication storage system in terms of the execution time or processing power required to add and remove data objects, another aspect of the system to consider is its efficiency in reclaiming space when data segments are no longer needed. Although maintaining reference information at the highly granular segment level can have the negative performance aspects discussed above, it may also have a positive side in that this segment-level reference information can make it easy to determine when a given segment is no longer referenced by any data object by simply checking whether the reference list for the segment is empty. If so, the segment can be deleted from the system, and its storage space can be reclaimed.

Since the deduplication storage system described herein may not track reference information at the segment level, the deduplication storage system may use a different technique to determine when storage space can be reclaimed. In a simplistic approach, the deduplication storage system could perform space reclamation only at the container level, e.g., by reclaiming the storage space for all the segments included in a given container only when the reference list for the container becomes empty. Suppose however that several of a container's segments are no longer being used by any data objects, but some still are. In an extreme example, only one of the container's segments could still be in use by one data object. It may be desirable to reclaim the storage space taken by the segments that are no longer in use, but if the above-described simplistic approach were used then the space would not be reclaimed because the reference list for the container still includes one data object and is thus not yet empty.

To address this issue, various embodiments of the deduplication storage system may enable storage space reclamation to be performed on a more granular level than the container level, e.g, at the level of individual data segments. This may be facilitated by tracking a logical size of each container. As described in detail below, when a new data object is added to a container's reference list, the logical size of the container may be increased. When a data object is removed from the container's reference list, the logical size of the container may be decreased. When the logical size of the container falls below a threshold level, this may be an indication that one or more of the segments included in the container are no longer being used by any data object, and an operation to reclaim the storage space allocated to one or more of the data segments included in the container may be performed. Thus, embodiments of the present deduplication storage system may achieve the performance efficiency that results from avoiding reference updates at the segment level while still achieving efficient space reclamation on an individual segment basis.

Referring now to FIG. 1, one embodiment of a deduplication storage system 100 is illustrated. In the illustrated embodiment the deduplication storage system 100 includes a storage server computer system 150 configured with deduplication software 50. The storage server computer system 150 is coupled via a network 180 to client computer systems 110a-c. The deduplication software 50 may execute on the storage server computer system 150 to receive data objects from the client computer systems 110a-c and store them on one or more storage devices 160 which is included in or coupled to the storage server computer system 150. In various embodiments the data objects stored by the deduplication software 50 may be received from any number and any type of client computer systems or other data sources.

The deduplication software 50 may also be configured to remove data objects from the storage device(s) 160. Exemplary methods for adding and removing data objects which may be implemented by the deduplication software 50 are described below.

In various embodiments any number of client computer systems may be coupled to the storage server computer system 150, and they may connect to the storage server computer system 150 through any kind of network 180 and/or through any kind of intermediate device(s). The network 180 may include any type of network or combination of networks. For example, the network may include any type or combination of local area network (LAN), a wide area network (WAN), wireless networks, an Intranet, the Internet, storage area network (SAN), etc. Examples of local area networks include Ethernet networks, Fiber Distributed Data Interface (FDDI) networks, and token ring networks. Also, computer may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

The storage device(s) 160 used in the deduplication storage system 100 may be or may include any type of device or combination of devices configured to store data. Examples of storage devices include disk-based devices (e.g., devices with one or more hard disk drives), tape devices, optical devices, solid state drives, flash memory devices, etc.

In various embodiments the deduplication storage system 100 may receive and store any kind of data objects. As used herein, the term data object may refer to any logical entity or data structure that encapsulates or represents a particular set of data. For example, in some embodiments each data object may be a file. As another example, in some embodiments each data object may be a backup image, e.g., a logical entity or data structure that encapsulates or represents data backed up from a particular data source. For example, a backup image may include a plurality of files backed up from a client computer system. In some embodiments the backup image may itself be represented as a special type of file (or set of files) which encapsulates the files backed up from the client, e.g., such that the backup image file(s) includes the file data of the files backed up from the client. In addition to the file data, the backup image file(s) may also include metadata describing the backup image or the files backed up from the client.

Figure 2:
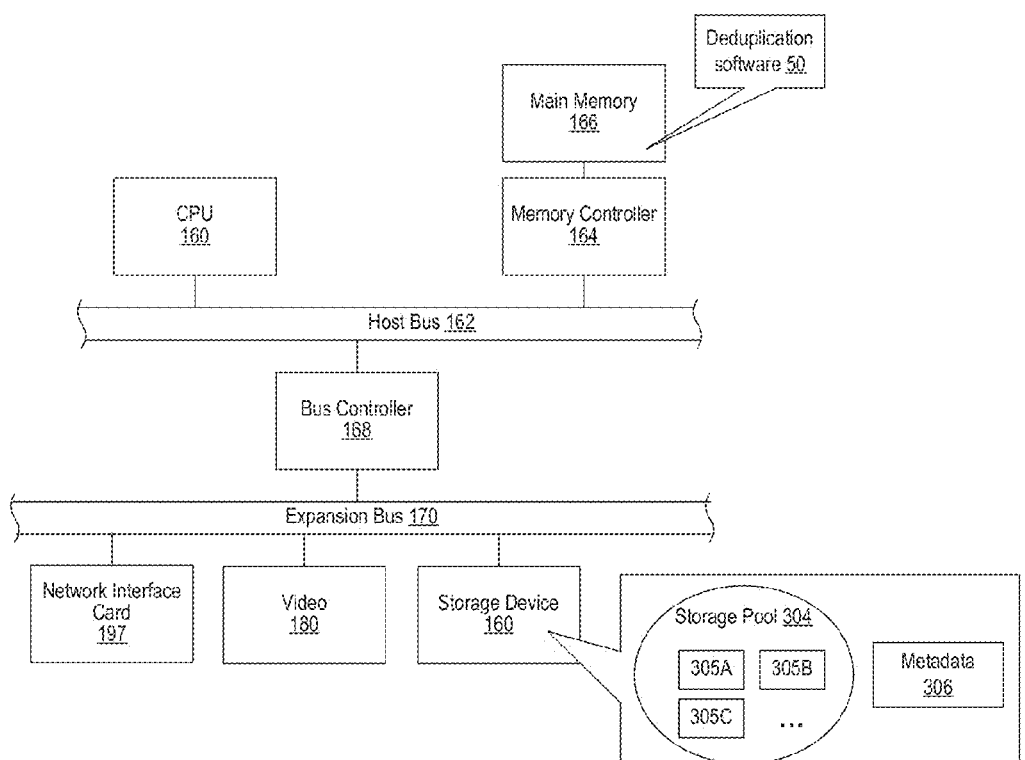
FIG. 2 illustrates one embodiment of a storage server computer included in the deduplication storage system.

FIG. 2 illustrates one embodiment of the storage server computer 150 in more detail. In various embodiments, the deduplication software 50 may execute on any kind of computer system or computing device(s), such as one or more personal computer systems (PC), workstations, servers, network appliances, or other type of computing device or combinations of devices. In general, the term "computer system" can be broadly defined to encompass any device (or combination of devices) having at least one processor that executes instructions from one or more storage mediums. The storage server computer 150 may have any configuration or architecture, and FIG. 2 illustrates a representative PC embodiment. Elements of a computer not necessary to understand the present description have been omitted for simplicity.

The storage server computer 150 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the storage server computer 150 may include multiple processors 160.

The storage server computer 150 may also include memory 166 in which program instructions implementing the deduplication software 50 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the storage server computer 150. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more storage devices 160. The storage device(s) 160 include any kind of device configured to store data, such as one or more disk drives for example. In the illustrated example, the one or more storage devices are coupled to the storage server computer system 150 via the expansion bus 170, but in other embodiments may be coupled in other ways, such as via a network interface card 197, through a storage area network (SAN), via a communication port, etc.

It is noted that FIG. 2 illustrates an example of a storage server computer 150 used in the deduplication storage system 100 according to one embodiment. In general, the deduplication storage system 100 may include any device or combination of devices having at least one processor and at least one storage device. In some embodiments the deduplication storage system may implement a cloud computing service for the client computer systems. For example, the deduplication storage system 100 may be located remotely from the client computer systems and may communicate with them via the Internet to provide cloud-based storage services to the client computer systems.

The deduplication software 50 may maintain a storage pool 304 in which data segments 305 can be stored. The term storage pool may refer to a portion of storage space located on one or more storage devices, e.g., the one or more storage devices 160. In various embodiments, any number of segments 305 may be stored in the storage pool 304. In some embodiments the number of segments may number in the millions or billions or even more.

Figure 7:
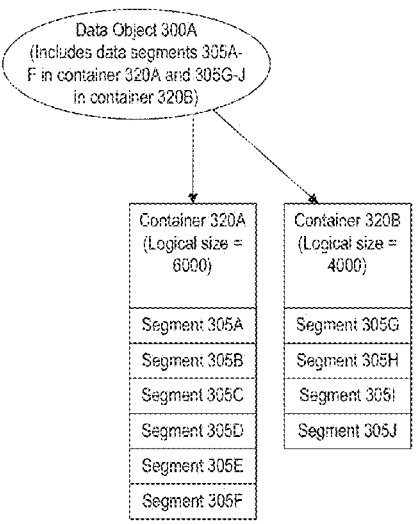

The deduplication software 50 may also maintain a plurality of data segment containers (hereinafter referred to as simply "containers") in which the data segments 305 are logically included. As used herein, the term container may refer to any data structure that logically includes one or more data segments. Each data segment may be included in one container. For example, FIG. 7 illustrates an example of two containers 320A and 320B. The container 320A includes six segments 305A-305F, and the container 320B includes four segments 305G-305J. (FIG. 7 is described in more detail below.)

In various embodiments a given container may include any number of data segments. Although a container may in some cases include only a single segment, this may be an unusual case, and containers may typically include multiple segments. For example, as described in more detail below, when a new data object is stored in the deduplication storage system, the deduplication software may split the new data object into segments and then store the segments in the system (assuming that they were not already stored in the system). In some embodiments the deduplication software may add or assign all the segments of the data object to the same container, e.g., so that they are all logically included in the same container. The container to which they are added may be a new container created in response to the request to store the new data object, or may be a container that already existed prior to receiving the request to store the new data object.

In some embodiments the containers may have a size limit. For example, each container may be limited to 1000 segments or some other maximum number of segments. Once the maximum number of segments have been included in a container, the container may be considered to be full, and new segments may thereafter be added to other containers. In other embodiments the maximum size of a container may be specified in other ways, e.g., in terms of the sum of the sizes (data lengths) of the segments included in the container. (In some embodiments the sizes of different segments may be different for various reasons, e.g., to increase the deduplication ratio, increase system performance, etc.)

In some embodiments a container may be implemented as a portion of storage space in which the data of the segments included in the container is stored. For example, if a container includes 5 segments that each have 100 kb of data then the container could be implemented as a file of at least 500 kb in length allocated for the container, where the data for each respective segment begins at a respective offset in the file. As another example, the container could be implemented as a database in which tables or other data structures are allocated to store the data of the segments included in the container. In other embodiments a container may logically include a set of segments, but the segment data may not be stored in space that is allocated for the container itself, but instead the data for each segment may be stored in space that is individually allocated for each segment. For example, each segment may be stored as an independent data structure, and a given container can be implemented as information specifying a list of the segments that are included in that container (as well as possibly also specifying other metadata about the container, such as a name of the container, a list of data objects that reference the container, etc). Thus, in some embodiments the segments may be stored independently of the containers while still being logically included in the containers.

Figure 3:
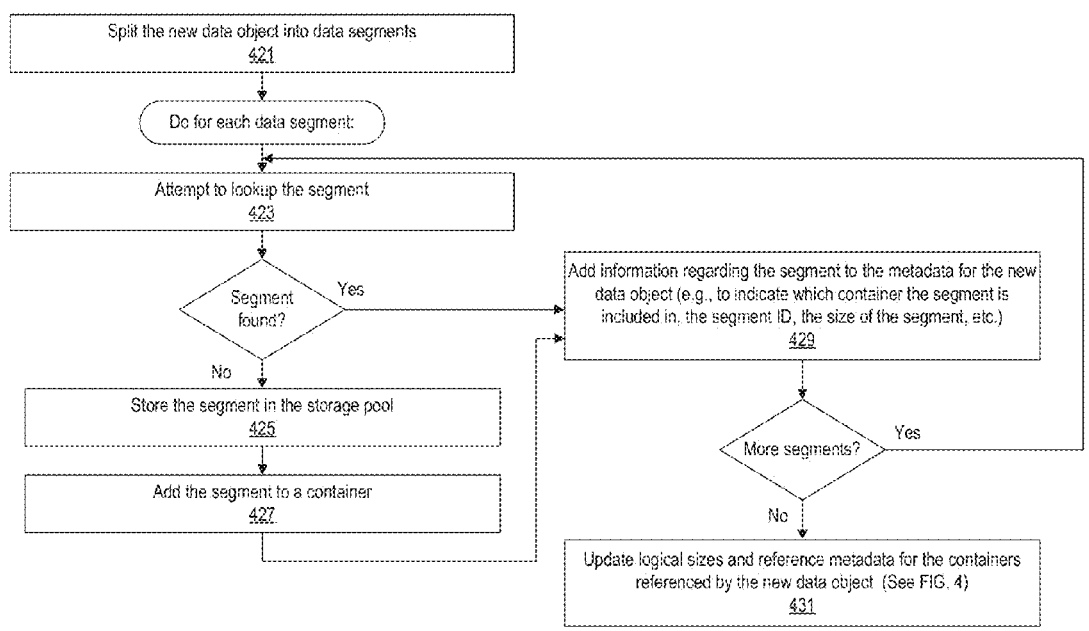
FIGS. 3 and 4 are flowchart diagrams illustrating one embodiment of a method for adding a new data object to the deduplication storage system.

FIG. 3 is a flowchart diagram illustrating one embodiment of a method for adding a new data object to the deduplication storage system 100. The method may be implemented by deduplication software 50, which may be executed by one or more processors in the deduplication storage system 100, e.g., one or more processors included in one or more computing devices of the deduplication storage system 100. The flowchart blocks of FIG. 3 illustrate logical operations that may be performed by the method according to some embodiments. In various embodiments of the method, some of the flowchart blocks may be combined, omitted, modified, or performed in different orders than shown.

In some embodiments the deduplication software 50 may receive the new data object from a client computer system or other data source coupled to the deduplication storage system 100. As one example, the new data object may be a new backup image of a plurality of files stored on the client computer system. For example, the deduplication software 50 may include a backup module configured to periodically (or aperiodically) communicate with the client computer system to create different backup images representing the state of a file system volume of the client computer system at various points in time. The backup images may be stored on the deduplication storage system 100 so that they are available if the file system volume ever needs to be restored to an earlier point in time. In some embodiments the backup images may have a specified retention period. For example, the deduplication storage system 100 may be configured to store each backup image for two weeks (or other configurable amount of time), after which the backup image may expire and be automatically removed from the deduplication storage system 100. The backup module may include a user interface that enables an administrator of the system to specify backup policy information, such as scheduling information specifying when to create new backup images for various client computer systems, how long to retain the backup images, whether the backup images are created as full backups or incremental backups, etc.

In other embodiments the new data object may be a single file stored on the client computer system or other data source, or the new data object may be some type of data component or object other than a file, such as a database object for example. Also, in some embodiments the new data object may originate from the deduplication storage system itself, e.g., may be a new file or other type of data object originally created by the same computer system that executes the deduplication software 50.

As indicated in block 421, the new data object may be split into data segments. Each data segment may be a data structure that includes a subset of the particular set of data which the data object encapsulates or represents. For example, if the data object is a file then each data segment may include a different portion of the file's data. Similarly, if the data object is a backup image which includes backup data from a client computer system then each data segment may include a different portion of the backup data.

In some embodiments the deduplication software 50 may receive the new data object in its original form (e.g., before it has been split into segments) and may then split the new data object into the segments. In other embodiments the new data object may be split into the data segments by the client computer system or other data source from which the new data object originates, and the segments may then be transmitted to the deduplication software 50. In some embodiments, before transmitting a given data segment, the client computer system may first communicate with the deduplication software 50 to check whether the segment is already stored in the deduplication storage system. If so then the segment may not be transmitted to the deduplication software 50 since an identical copy of the same segment may not need to be stored again.

In various embodiments any desired algorithm or technique may be used to split the new data object into segments or identify the boundaries of the segments. In some embodiments the new data object may be split into fixed-size segments, e.g., so that each of the segments is the same fixed size. For example, the fixed segment size could be 2 kb, 100 kb, or any other desired segment length. In other embodiments the new data object may be split into variable-sized segments, e.g., so that different segments can have different sizes. A variable-sized splitting algorithm may be designed to split different data objects that vary from each other only slightly into segments such that one or more of the segments are common to both of the data objects.

Referring again to FIG. 3, for each data segment of the new data object, the deduplication software 50 may attempt to lookup the segment to determine whether the segment is already stored in the segment storage pool maintained for the deduplication storage system (block 423). For example, the client computer system from which the data object originates may compute a fingerprint or identifier (ID) of the segment which uniquely identifies the segment. In some embodiments the fingerprint may be computed by applying a hash algorithm to the data of the segment to produce a hash value that uniquely identifies the segment. The fingerprint may be significantly shorter in length than the segment itself so that it can be efficiently transmitted over a network to the deduplication software 50. The deduplication software 50 may maintain metadata about the segments stored in the storage pool, which may include information specifying the fingerprint of each segment and the container which includes each segment. The deduplication software 50 may implement a lookup function that accepts a segment fingerprint as an input parameter and checks the metadata to determine whether the corresponding segment is already stored in the storage pool. Thus, the deduplication software 50 may invoke this lookup function with the fingerprint of each respective segment of the new data object. If the segment is found, the lookup function may return information specifying which container the segment includes the segment. Otherwise, the lookup function may indicate that the segment was not found.

If the segment was not found and if the deduplication software 50 does not already have the segment's data (e.g., if it has not yet been transmitted from the client computer system) then the deduplication software 50 may indicate to the client computer system that the segment's data needs to be transmitted to the deduplication storage system 100 so that it can be stored. The deduplication software 50 may then store the segment in the storage pool maintained for the deduplication storage system 100 (block 425), e.g., by copying the segment's data into a portion of the storage pool's storage space. The segment may be logically added to or included in one of the containers maintained by the deduplication software 50 (block 427). The container to which the segment is added may be selected as a container which already exists and is not yet full, or a new container to hold the segments of the new data object may be created. In some embodiments, the segment may be stored within a portion of storage space allocated for the container to which the segment is added. In other embodiments the segment may be stored separately from any storage space that may be allocated to the container itself, e.g., by allocating new storage space for the segment and copying the segment's data into the allocated space.

For each container, the deduplication software 50 may maintain metadata for the container that specifies which segments are included in the container. Thus, in some embodiments, adding the segment to the container may include modifying the container's metadata to indicate that the segment is included in the container, e.g., by adding a fingerprint or other ID of the segment to a list of segments included in the container.

The deduplication software 50 may also maintain metadata for each segment that specifies which container the segment is included in. Thus, in some embodiments, adding the segment to the container may include modifying the metadata for the segment to indicate that the segment is included in the container, e.g., by a name or other ID of the container to the segment's metadata.

Referring again to FIG. 3, if the lookup function found the segment then the segment does not need to be stored in the segment pool again, and thus blocks 425 and 427 may not be performed in this case.

The deduplication software 50 may also create a data structure representing the new data object. The data structure may not include the actual data of the data object (as this is stored in the data segments), but may include metadata specifying which data segments make up the data object. As indicated in block 429, for each segment of the data object, the deduplication software 50 may add information regarding the segment to the data object's metadata. The information regarding the segment may include the fingerprint or other ID of the segment, the name or other ID of the container that includes the segment, the size of the segment, etc.

Figure 4:
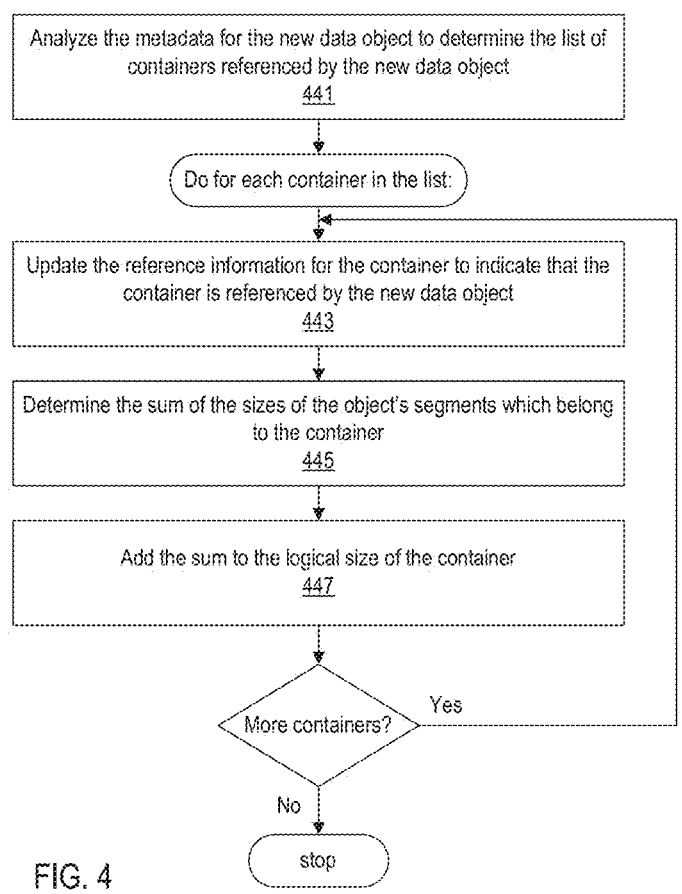

After each segment of the new data object has been processed as described above, the deduplication software 50 may update the logical sizes and reference metadata for the containers referenced by the new data object, as indicated in block 431. FIG. 4 is a flowchart diagram illustrating this functionality. The flowchart blocks of FIG. 4 illustrate logical operations that may be performed according to some embodiments. In other embodiments some of the operations of the flowchart blocks may be combined, omitted, modified, or performed in different orders than shown.

As discussed above, the deduplication software 50 may perform reference updating at the container level rather than at the more granular segment level. The metadata for each container may include reference information specifying which data objects reference the container. Thus, for each container which includes one or more of the data segments of the new data object, the reference information for the container may need to be updated to indicate that the container is referenced by the new data object. In some embodiments this may be accomplished as shown in blocks 441 and 443. The deduplication software 50 may analyze the metadata for the new data object to determine the list of containers referenced by the new data object (block 441). For each container in the list, the deduplication software 50 may update the reference information for the container to indicate that the container is referenced by the new data object, e.g., by adding an ID of the new data object to the container's reference information. It is noted that if more than one of the new data object's segments are included in a given container, the container may be added to the list only once in block 441. Thus, only a single reference update operation may need to be performed for each container referenced by the new data object, which may result in efficiency increases compared to segment-level reference updating, as discussed above.

As discussed above, the deduplication software 50 may also track the logical size of each container, e.g., by storing the logical size in the container's metadata and updating it as data objects referencing the container are added to and removed from the system. When a new container is first created, its logical size may be set to 0. When a new segment is added to the container, the deduplication software 50 may increase the logical size of the container by the size of the segment. When a new data object that references one of the data segments already included in the container is added to the system, the deduplication software 50 may again increase the logical size of the container by the size of the segment. If the new data object references more than one of the container's segments, the logical size may be increased by the sum of the sizes of all the segments referenced by the new data object. In some embodiments, this functionality may be implemented as shown in blocks 445 and 447. For each container in the list of containers referenced by the new data object, the deduplication software may determine the sum of the sizes of the new data object's segments which belong to the container (block 445). For example, if the new data object references three segments in a given container with a size of 2 kb each then the sum for that container would be 6 kb. The deduplication software 50 may then add the sum determined for each container to the logical size of the container (block 447).

When a data object is removed from the deduplication storage system, the logical sizes of the containers referenced by the data object may be decreased, which may then possibly cause the deduplication software 50 to mark one or more of these containers as candidates for space reclamation, as will be presently described with reference to FIG. 5.

Figure 5:
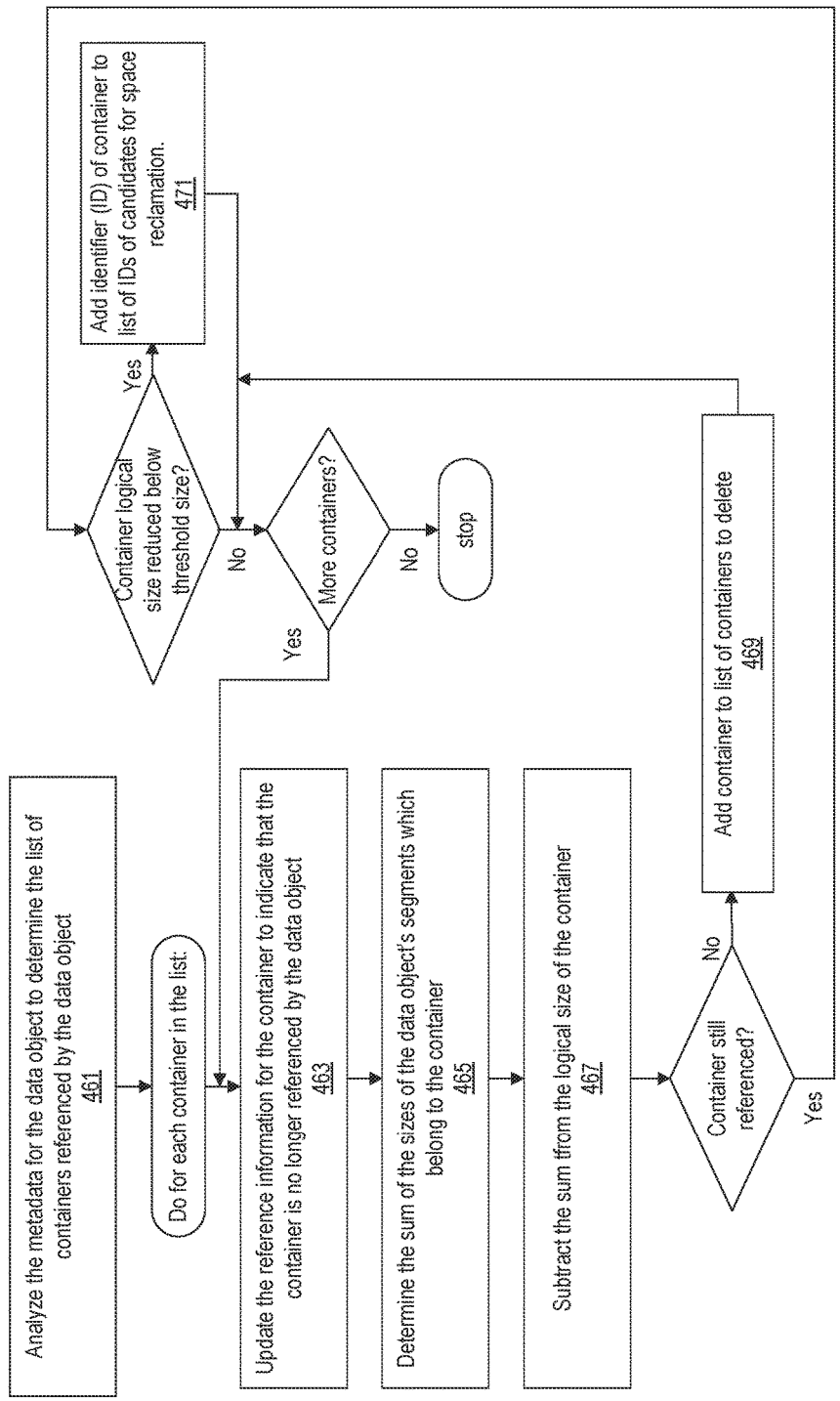
FIG. 5 is a flowchart diagram illustrating one embodiment of a method for removing a data object from the deduplication storage system.

FIG. 5 is a flowchart diagram illustrating one embodiment of a method for removing a data object from the deduplication storage system 100. The method may be implemented by the deduplication software 50. The flowchart blocks of FIG. 5 illustrate logical operations that may be performed by the method according to some embodiments. In various embodiments of the method, some of the operations shown in the flowchart blocks may be combined, omitted, modified, or performed in different orders than shown.

In response to receiving a request to remove the data object, the deduplication software 50 may analyze the metadata for the data object to determine the list of containers referenced by the data object (block 461). For each container in the list, the deduplication software 50 may perform the additional operations shown in the flowchart. In particular, the deduplication software 50 may update the reference information for each container to indicate that the container is no longer referenced by the data object (block 463). For each container in the list, the deduplication software 50 may also determine the sum of the sizes of the data object's segments which belong to the container (block 465), and may subtract the sum from the logical size of the container (block 467).

For each container in the list, the deduplication software 50 may check the reference information for the container to determine whether the container is still referenced by any other data object. If the container was previously only referenced by the data object being removed then its reference list should now be empty, indicating that the container is no longer referenced. In this case, the deduplication software 50 may add the ID of the container to a list of containers to be deleted (block 469). For example, a background task may periodically execute to check this list and delete the listed containers. For a given container, deleting the container may include deleting all the segments included in the container from the deduplication storage system, which may reclaim or free the storage space that was allocated to them so that it becomes available to be re-allocated for other purposes. Any storage space that was allocated to the container itself may also be reclaimed, and any metadata maintained for the container may be deleted.

Otherwise, if the container is still referenced by one or more data objects, the deduplication software 50 may check to determine whether reducing the logical size of the container in block 467 caused the logical size to fall below a threshold size. If so, this may indicate that one or more of the container's data segments are no longer needed, and thus the deduplication software may add the ID of the container to a list of containers to compact (block 471). For example, a background task may periodically execute to check this list and attempt to compact the listed containers. As described in detail below, compacting a given container may include performing an operation to reclaim the storage space allocated to one or more of the data segments included in the container.

Figure 6:
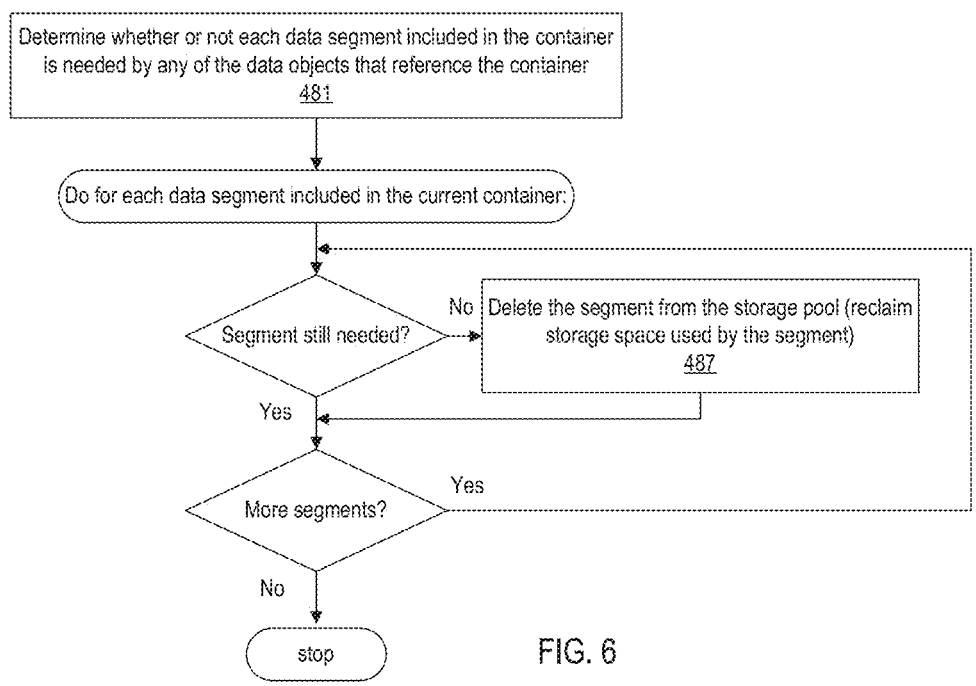
FIG. 6 is a flowchart diagram illustrating one embodiment of a method for compacting a container to reclaim the storage space used by one or more data segments used in the container.

FIG. 6 is a flowchart diagram illustrating one embodiment of a method for compacting a container. As indicated in block 481, the deduplication software 50 may determine whether or not each data segment included in the container is needed by any of the data objects that reference the container. For example, the deduplication software 50 may examine the metadata of the container to determine which segments are included in the container and which data objects reference the container. For each data object that references the container, the deduplication software 50 may examine the metadata of the data object to determine the list of data segments that compose the data object. Various types of marking or comparison algorithms may be performed to determine whether or not each data segment included in the container is included in the list of data segments for any of the data objects that reference the container. One example of such an algorithm is described below with reference to FIGS. 13 and 14.

For each data segment of the container, if the deduplication software 50 determines that the segment is no longer needed (e.g., no longer referenced by any data object) then the deduplication software 50 may delete the segment from the storage pool of the deduplication storage system, which may include reclaiming the storage space taken by that segment (block 487).

FIGS. 7-17 illustrate an example of how a storage pool may be affected as data objects are added to and removed from the deduplication storage system. For clarity of illustration, this example is somewhat simplified. For example, the containers in this example are assumed to have a maximum size of 6 segments, whereas there may be dozens, hundreds, or thousands of segments in a container in a more typical real-world example. Also, each segment is assumed to have a fixed size of 1000 bytes in this example, whereas in other embodiments the segments may have other fixed sizes or may be variably sized.

FIG. 7 illustrates a point in time in which a data object 300A having 10 segments is stored in the system. The 6 segments 305A-F are included in the container 320A which is referenced by the data object 300A. At this point in time, the container 320A is not referenced by any other data object, and so the logical size of the container 320A is 6000 bytes (the sum of the sizes of the 6 segments 305A-F). The 4 segments 305G-J are included in the container 320B which is also referenced by the data object 300A. Again, at this point in time, the container 320B is not referenced by any other data object, and so the logical size of the container 320B is 4000 bytes (the sum of the sizes of the 4 segments 305G-J).

Figure 8:
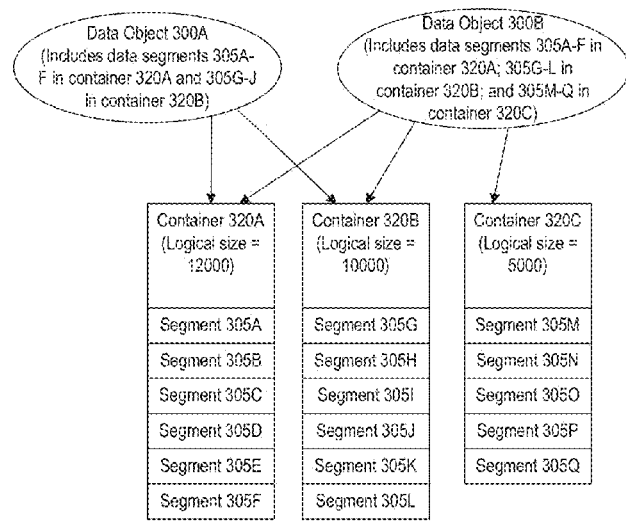

FIG. 8 illustrates a later point in time after a new data object 300B has been added to the system. The data object 300B uses all six of the segments 305A-F which were already stored in the system and included in the container 320A. As a result, the logical size of the container 320A has been increased by 6000 bytes (the sum of the segment sizes used by the data object 300B with respect to this container) to 12000 bytes.

The data object 300B also uses all four of the segments 305G-J which were already stored in the system and included in the container 320B. In addition, the data object 300B also references 7 new segments 305K-Q which were not previously stored in the system. As shown, these segments have been added to the system. Two of the new segments 305K-L have been included in the container 320B, and the other four new segments 305M-Q have been included in a new container 320C. The logical size of the container 320A has been increased by 6000 bytes (the sum of the segment sizes used by the data object 300B with respect to this container) to 10000 bytes. The logical size of the container 320C has been set to 5000 bytes (the sum of the segment sizes used by the data object 300B with respect to this container).

Figure 9:
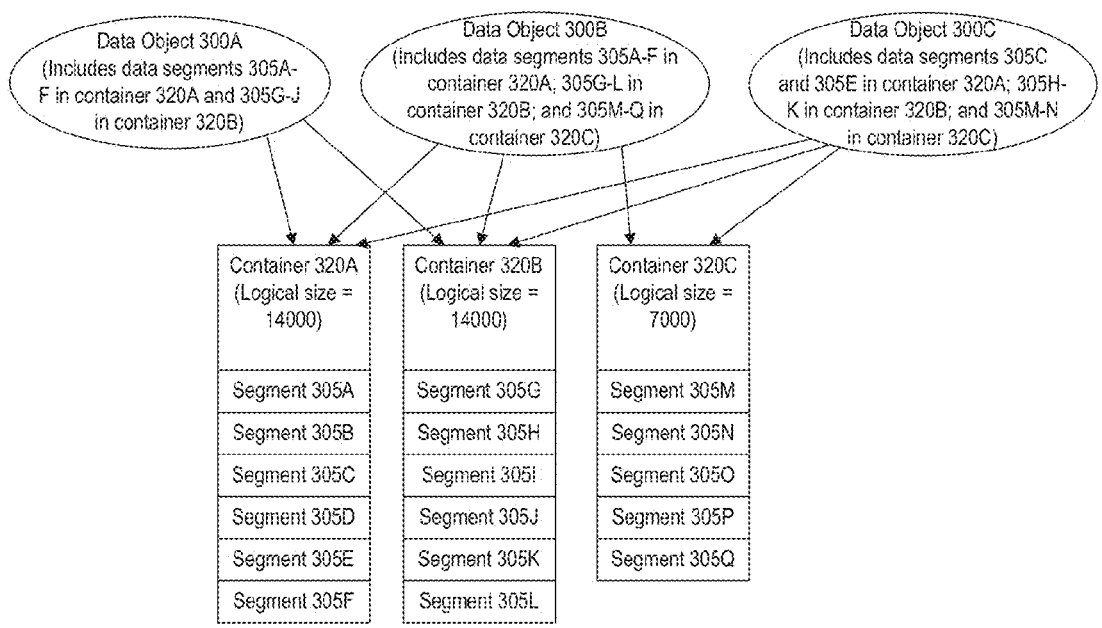

FIG. 9 illustrates a later point in time after a new data object 300C has been added to the system. The data object 300C uses two of the segments 305C and 305E which were already stored in the system and included in the container 320A. As a result, the logical size of the container 320A has been increased by 2000 bytes to 14000 bytes. The data object 300C also uses four of the segments 305H-K which were already stored in the system and included in the container 320B. As a result, the logical size of the container 320B has been increased by 4000 bytes to 14000 bytes. The data object 300C also uses two of the segments 305M-N which were already stored in the system and included in the container 320C. As a result, the logical size of the container 320C has been increased by 2000 bytes to 7000 bytes. The data object 300C does not require any other data segments, and so no new segments needed to be added to add the data object 300C to the system.

Figure 10:
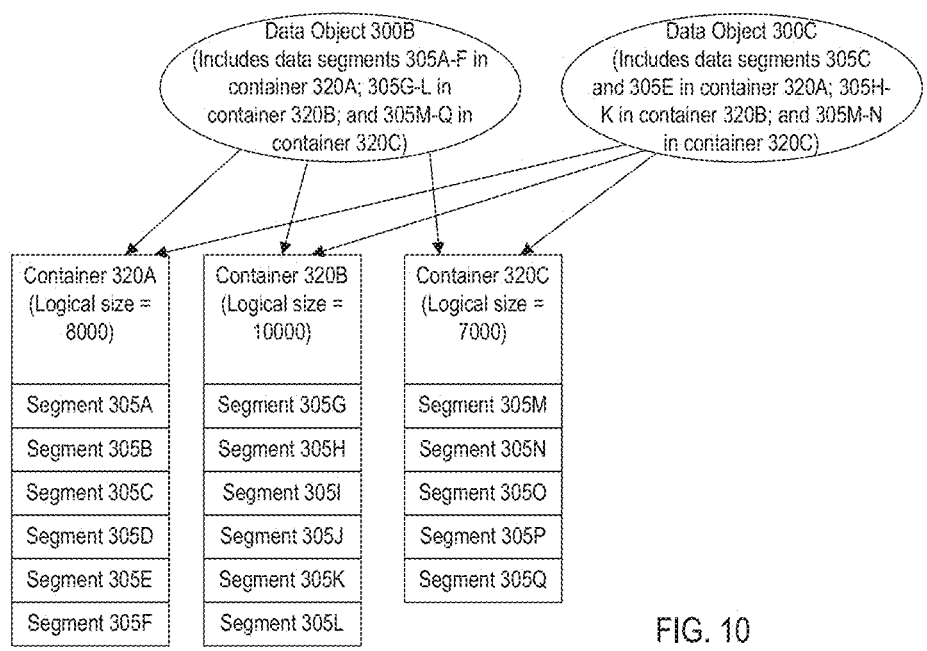

FIG. 10 illustrates a later point in time after the data object 300A has been removed from the system. For example, in some embodiments the data object 300A may be a backup image set to automatically expire and be removed from the system after a certain amount of time. As another example, the data object 300A may be a file stored on behalf of a user, and the user may request the file to be deleted from the system. The logical size of the container 320A has been reduced by 6000 bytes (the sum of the segment sizes used by the data object 300A with respect to this container) to 8000 bytes. The logical size of the container 320B has been reduced by 4000 bytes (the sum of the segment sizes used by the data object 300A with respect to this container) to 10000 bytes.

As discussed above, when the logical size of a container is reduced, the deduplication software may check whether the logical size has fallen below a threshold size and if so may add the container to a list of containers to be compacted. In various embodiments the threshold size may be set to various sizes. In some embodiments the deduplication software 50 may provide a user interface that enables an administrator of the system to set the threshold size. In this example, it is assumed that the threshold size for a given container is set to be the same as the actual size of the container (the sum of the sizes of all the segments included in the container). Thus, the threshold size for the containers 320A and 320B is 6000 bytes (since they each include 6 segments sized 1000 bytes each). This means that the logical size for both of these containers is still above the threshold size, and so neither container has been marked for compaction.

In other embodiments the threshold size may be set to be more than or less than the actual size of the container. Setting a lower threshold size may increase the probability that at least one of the segments in a container can be reclaimed when a compaction operation is performed on the container, but it may decrease the probability that the logical size of the container will fall below the threshold size. Setting a higher threshold size may decrease the probability that any of the segments in a container can be reclaimed when a compaction operation is performed on the container, but it may increase the probability that the logical size of the container will fall below the threshold size. Thus, the threshold size may be set to an appropriate value to achieve the desired tradeoff between the benefit gained by potential space reclamation versus the performance cost of performing the compaction/reclamation operations.

In other embodiments the deduplication software 50 may mark a container for compaction based on criteria other than whether the logical size has fallen below a threshold size. For example, when the logical size of a container is reduced, the deduplication software 50 may determined whether the logical size has fallen by a threshold amount or percentage relative to a previous logical size of the container. For example, at a first point in time the logical size of a container with an actual size of 6000 bytes may be 200000 bytes. At a later point in time the logical size may be 8000 bytes indicates that the logical size of the container has fallen by a large percentage compared to what it was previously. In some embodiments it may be desirable to perform a compaction/reclamation algorithm on the container in this situation even though the logical size of the container is still greater than its actual size.

Figure 11:
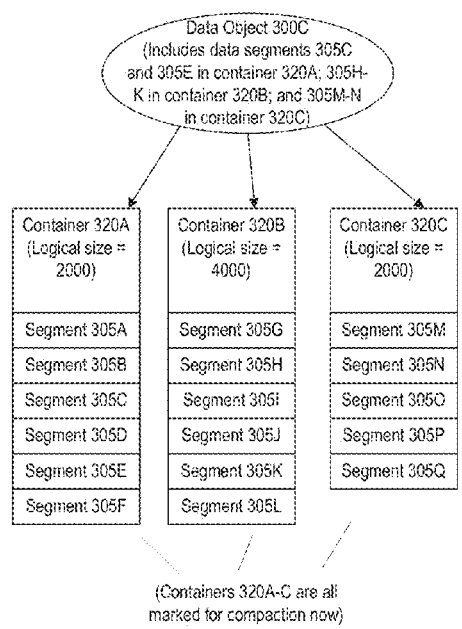

FIG. 11 illustrates a later point in time after the data object 300B has been removed from the system. The logical size of the container 320A has been reduced by 6000 bytes to 2000 bytes, which is below the threshold size of 6000 bytes (again assuming in this example, that the threshold size is the same as the actual size). As a result, the container 320A has been marked for compaction. The logical size of the container 320B has been reduced by 6000 bytes to 4000 bytes, and the logical size of the container 320C has been reduced by 5000 bytes to 2000 bytes. Thus the logical sizes of the containers 320B and 320C are also below their threshold values, and these containers have also been marked for compaction.

Figure 12:
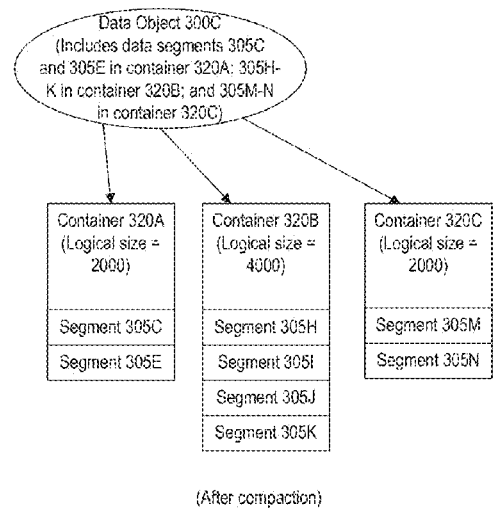

FIG. 12 illustrates a later point in time after the compaction/reclamation operations have been performed on the containers 320A-C. The logical sizes of the containers are still the same, but the segments which are no longer referenced by any data objects have been deleted from the system, and their storage space has been reclaimed. FIGS. 13 and 14 illustrate an example of how the compaction algorithm may operate in some embodiments. The deduplication software may add a data structure corresponding to each of the segments in the containers marked for compaction to a segment index 334. The data structure corresponding to each segment may include a field that indicates whether or not the segment is used by any of the data objects that reference the container in which the segment is included. This field may initially be set to "No" for each data structure. For each data object that references one of the containers marked for compaction, the deduplication software 50 may then examine the metadata of the data object to determine which segments are used by the data object. For each segment that matches one of the segments in the segment index 334, the Used field in the corresponding data structure for the segment may be changed to "Yes". Thus, as shown in FIG. 14 the segments that are still used by one or more data objects may be marked as "Yes" while the others may be marked as "No". The deduplication software 50 may delete the segments marked as "No" from the system and reclaim their storage space.

Figure 15:
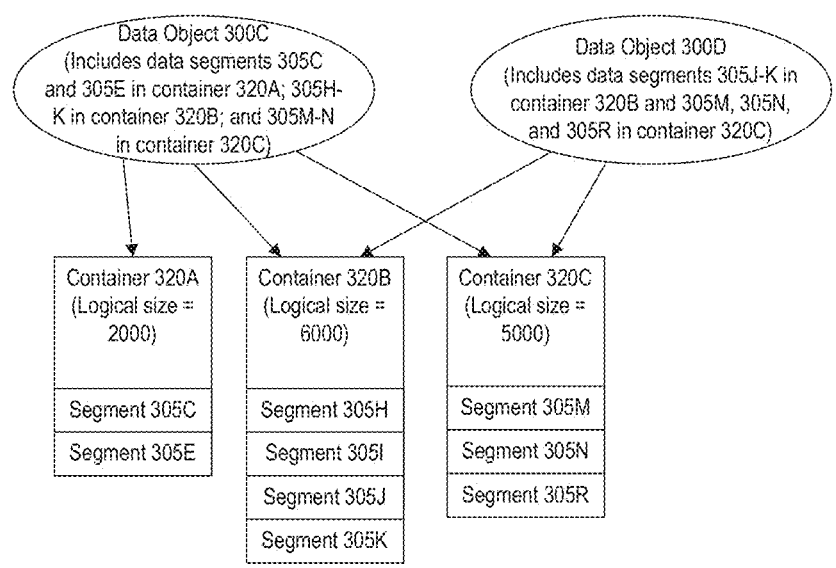

Continuing the example, FIG. 15 illustrates a later point in time after a new data object 300D has been added to the system. The data object 300D references the segments 305J-K in the container 320B, and the logical size for this container has accordingly been increased by 2000 bytes to 6000 bytes. The data object 300D also references the 2 previously existing segments 305M-N in the container 320B, as well as a new data segment 305R added to the container 320B. The logical size for this container has accordingly been increased by 3000 bytes to 5000 bytes.

Figures 16, 17:
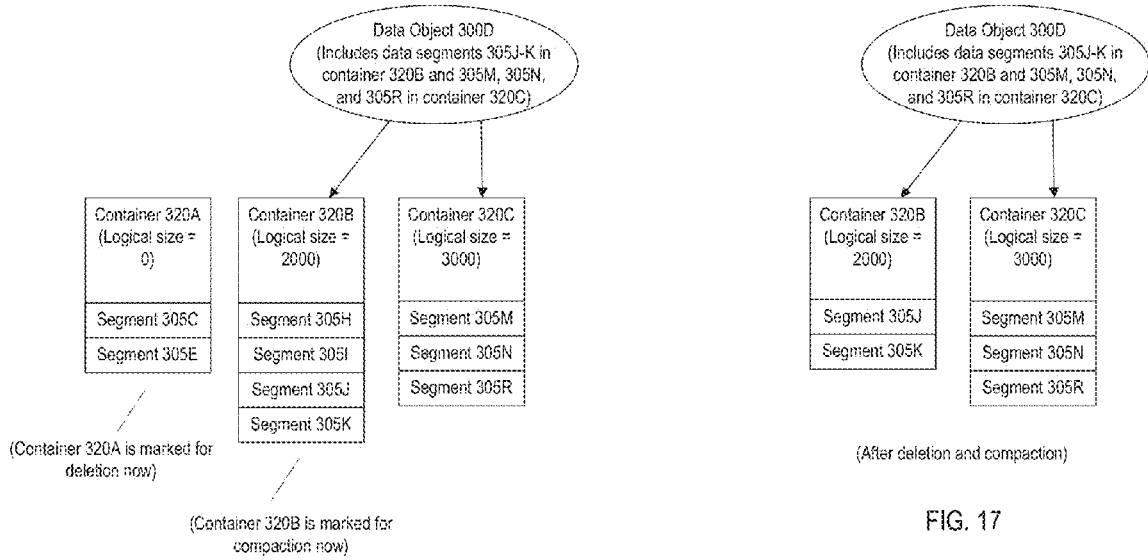

FIG. 16 illustrates a later point in time after the data object 300C has been removed from the system. The logical size of the container 320A has been reduced by 2000 bytes to 0 bytes, and the reference information for the container 320A is now empty. As a result, the container 320A has been marked for deletion. The logical size of the container 320B has been reduced by 4000 bytes to 20000 bytes, which is below the container's threshold size/actual size of 4000 bytes. As a result, the container 320B has been marked for compaction. The logical size of the container 320C has been reduced by 2000 bytes to 3000 bytes, which is not yet below the container's threshold size/actual size of 3000 bytes, so this container is not marked for compaction. FIG. 17 illustrates a later point in time after the container 320A has been deleted and the container 320B has been compacted.

Figure 18:
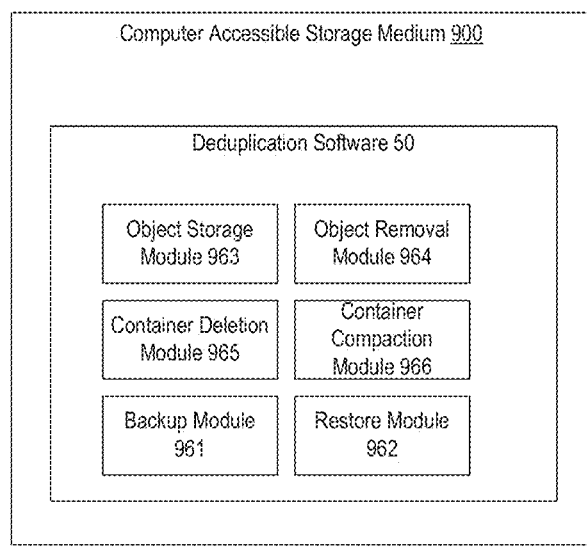
FIG. 18 is a block diagram of a computer accessible storage medium storing deduplication software.

Turning now to FIG. 18, a block diagram of a computer accessible storage medium 900 is shown. The computer accessible storage medium 900 may store program instructions executable by one or more processors to implement various functions described above, such as program instructions associated with the deduplication software 50. Generally, the deduplication software 50 may include any set of instructions which, when executed, implement a portion or all of the functions described herein. For example, the deduplication software 50 may include an object storage module 963 configured to add new data objects to the deduplication storage system. The deduplication software 50 may also include an object removal module 964 configured to remove data objects from the deduplication storage system. The deduplication software 50 may also include a container deletion module 965 configured to delete containers marked for deletion. The deduplication software 50 may also include a container compaction module 966 configured to perform compaction/space reclamation for containers marked for compaction. In some embodiments the deduplication software 50 may also include a backup module 961 configured to communicate with one or more client computer systems to create a backup image. The backup module 961 may interface with the object storage module 963 to add the backup image to the deduplication storage system. The deduplication software 50 may also include a restore module 962 configured to restore backup images stored in the deduplication storage system to a client computer system.

Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. A non-transitory computer-accessible storage medium storing program instructions executable by one or more processors to:
   store a plurality of data objects in a deduplication storage system, wherein said storing the data objects includes receiving a plurality of data segments of the data objects and storing the data segments on one or more storage devices;
   maintain a plurality of data segment containers, wherein each of the containers includes two or more of the data segments, wherein said maintaining the containers comprises maintaining metadata associated with each container, wherein said metadata:
      indicates a respective logical size of a corresponding container; and
      identifies which of the plurality of data objects reference the corresponding container;
   in response to a request to remove a data object from the deduplication storage system:
      mark the data object as having been removed from the deduplication storage system;
      identify a particular container referenced by the data object;
      determine a sum of sizes of segments in the particular container referenced by the data object;
      update metadata of the particular container to:
         indicate the particular container is no longer referenced by the data object; and
         reduce a logical size of the particular container by the sum of sizes;
      in response to determining the particular container was referenced by only the data object being removed from the deduplication storage system, add the particular container to a list of containers to be deleted; and
      in response to determining the particular container was not referenced by only the data object being removed from the deduplication storage system:
         if the particular container is not yet empty and the logical size of the particular container has fallen below a threshold, mark the particular container as a candidate for space reclamation without analyzing each data segment in the particular container to determine if each said data segment is referenced by any of the data objects that reference the container, wherein a given container marked as candidate for space reclamation is a container that will be analyzed at a later time to determine if any space occupied by the given container can be reclaimed.

2. The non-transitory computer-accessible storage medium of claim 1, wherein the program instructions are executable by the one or more processors to add a new data object to the deduplication storage system, wherein in said adding the new data object, the program instructions are executable by the one or more processors to:
   for each respective container of at least a subset of the plurality of containers:
      determine that the respective container already includes one or more data segments of the new data object; and
      in response to said determining, increase the logical size of the respective container such that the logical size of the respective container exceeds an actual size of the container.

3. The non-transitory computer-accessible storage medium of claim 2, wherein each data segment has a size, wherein in said increasing the logical size of each respective container of said at least a subset of the plurality of containers, the program instructions are executable by the one or more processors to:
   for each respective data segment of the one or more data segments of the new object that are already included in the respective container, add the size of the respective data segment to the logical size of the respective container.

4. The non-transitory computer-accessible storage medium of claim 1, wherein the program instructions are executable by the one or more processors to add a new data object to the deduplication storage system, wherein in said adding the new data object, the program instructions are executable by the one or more processors to:
   for each respective container of at least a subset of the plurality of containers:
      determine that the respective container already includes one or more data segments of the new data object; and
      update reference information for the respective container to indicate that the respective container is referenced by the new data object.

5. The non-transitory computer-accessible storage medium of claim 4, wherein the program instructions are executable by the one or more processors to add the new data object to the deduplication storage system without updating reference information for individual data segments of the new data object.

6. The non-transitory computer-accessible storage medium of claim 1, wherein the program instructions are executable by the one or more processors to remove a particular data object from the deduplication storage system, wherein in said removing the particular data object, the program instructions are executable by the one or more processors to:
   for each respective container of at least a subset of the plurality of containers:
      determine that the respective container includes one or more data segments of the particular data object; and
      in response to said determining, decrease the logical size of the respective container.

7. The non-transitory computer-accessible storage medium of claim 6, wherein each data segment has a size, wherein in said decreasing the logical size of each respective container of said at least a subset of the plurality of containers, the program instructions are executable by the one or more processors to:
   calculate a sum of the sizes of the one or more data segments of the particular object that are included in the respective container; and
   subtract the sum from the logical size of the respective container.

8. The non-transitory computer-accessible storage medium of claim 1, wherein the program instructions are executable by the one or more processors to remove a particular data object from the deduplication storage system, wherein in said removing the particular data object, the program instructions are executable by the one or more processors to:
   for each respective container of at least a subset of the plurality of containers:

determine that the respective container includes one or more data segments of the particular data object; and
update reference information for the respective container to indicate that the respective container is no longer referenced by the particular data object.

9. The non-transitory computer-accessible storage medium of claim 8, wherein in said removing the particular data object, the program instructions are further executable by the one or more processors to:
in response to determining that a given container is no longer referenced by any data object, reclaim the given container, wherein said reclaiming the given container comprises reclaiming storage space for each data segment included in the given container.

10. The non-transitory computer-accessible storage medium of claim 1, wherein during each data object removal, the program instructions are executable by the one or more processors to remove each data object indicated to be removed from the deduplication storage system without updating reference information for individual data segments.

11. The non-transitory computer-accessible storage medium of claim 1, wherein to reclaim the storage space allocated to the particular container the program instructions are executable by the one or more processors to:
determine a first one or more data segments of the one or more data segments included in the particular container are no longer needed in the deduplication storage system; and
in response to said determining, reclaim the storage space allocated to the first one or more data segments.

12. The non-transitory computer-accessible storage medium of claim 11,
wherein the particular container also includes a second one or more data segments that are still needed in the deduplication storage system;
wherein in said reclaiming the storage space allocated to the first one or more data segments, the program instructions are executable by the one or more processors to:
create a new container to replace the particular container;
copy each data segment of the second one or more data segments from the particular container to the new container;
store metadata indicating that each data segment of the second one or more data segments is included in the new container; and
delete the particular container.

13. The non-transitory computer-accessible storage medium of claim 1, wherein to compact the marked particular container and reclaim the storage space allocated in the particular container, wherein no data segments of the one or more data segments are yet identified for having respective storage space to be reclaimed, the program instructions are executable by the one or more processors to:
determine a set of one or more data objects that reference the particular container;
for each respective data segment of each respective data object of the set of data objects, store information to indicate that the respective data segment is still needed in the deduplication storage system based on maintained reference information for the particular container and not based on maintained reference information for individual data segments; and
reclaim the storage space allocated to a first one or more data segments of the one or more data segments included in the particular container in response to determining that no information was stored to indicate that the first one or more data segments are still needed in the deduplication storage system.

14. The non-transitory computer-accessible storage medium of claim 1, wherein in further response to detecting that the logical size of the particular container has been reduced by at least a threshold amount relative to a previous logical size of the particular container, mark the particular container as a candidate for space reclamation prior to determining whether each data segment included in the particular container is referenced by any of the data objects that reference the container.

15. The non-transitory computer-accessible storage medium of claim 1, wherein a logical size of a given container is proportional to a number of references to data segments within the container.

16. The non-transitory computer-accessible storage medium of claim 1, wherein the plurality of data objects include one or more backup images, wherein each backup image includes a plurality of files backed up from a client computer system.

17. The non-transitory computer-accessible storage medium of claim 1, wherein maintaining a respective logical size for a given container comprises storing the logical size with metadata corresponding to the given container.

18. A method comprising:
storing a plurality of data objects on one or more storage devices, wherein said storing the data objects includes receiving a plurality of data segments of the data objects and storing the data segments on the one or more storage devices;
maintaining a plurality of data segment containers, wherein each of the containers includes two or more of the data segments, wherein said maintaining the containers comprises maintaining metadata associated with each container, wherein said metadata:
indicates a respective logical size of a corresponding container; and
identifies which of the plurality of data objects reference the corresponding container;
in response to a request to remove a data object from the deduplication storage system:
marking the data object as having been removed from the deduplication storage system;
identifying a particular container referenced by the data object;
determining a sum of sizes of segments in the particular container referenced by the data object;
updating metadata of the particular container to:
indicate the particular container is no longer referenced by the data object; and
reduce a logical size of the particular container by the sum of sizes;
in response to determining the particular container was referenced by only the data object being removed from the deduplication storage system, adding the particular container to a list of containers to be deleted; and
in response to determining the particular container was not referenced by only the data object being removed from the deduplication storage system:
if the particular container is not yet empty and the logical size of the particular container has fallen below a threshold, marking the particular container as a candidate for space reclamation without analyzing each data segment in the particular container to determine if each said segment is referenced by any of the data objects that reference the container, wherein a given container marked as candidate for space reclamation is a container that will be analyzed at a later time to determine if any space occupied by the given container can be reclaimed.

19. The method as recited in claim 18, wherein a logical size of a given container is proportional to a number of references to data segments within the container.

20. A system comprising:

one or more storage devices;

one or more processors; and memory storing program instructions, wherein the program instructions are executable by the one or more processors to:

store a plurality of data objects on the one or more storage devices, wherein said storing the data objects includes receiving a plurality of data segments of the data objects and storing the data segments on the one or more storage devices;

maintain a plurality of data segment containers, wherein each of the containers includes two or more of the data segments, wherein said maintaining the containers comprises maintaining metadata associated with each container, wherein said metadata:

indicates a respective logical size of a corresponding container; and identifies which of the plurality of data objects reference the corresponding container;

in response to a request to remove a data object from the deduplication storage system:

mark the data object as having been removed from the deduplication storage system;

identify a particular container referenced by the data object;

determine a sum of sizes of segments in the particular container referenced by the data object;

update metadata of the particular container to:

indicate the particular container is no longer referenced by the data object; and reduce a logical size of the particular container by the sum of sizes;

in response to determining the particular container was referenced by only the data object being removed from the deduplication storage system, add the particular container to a list of containers to be deleted; and in response to determining the particular container was not referenced by only the data object being removed from the deduplication storage system:

if the particular container is not yet empty and the logical size of the particular container has fallen below a threshold, mark the particular container as a candidate for space reclamation without analyzing each data segment in the particular container to determine if each said segment is referenced by any of the data objects that reference the container, wherein a given container marked as candidate for space reclamation is a container that will be analyzed at a later time to determine if any space occupied by the given container can be reclaimed.

* * * * *